United States Patent
Park et al.

(10) Patent No.: US 10,977,170 B2
(45) Date of Patent: Apr. 13, 2021

(54) MEMORY CONTROLLER FOR PERFORMING UNMAP OPERATION AND MEMORY SYSTEM HAVING THE SAME

(71) Applicant: SK hynix Inc., Gyeonggi-do (KR)

(72) Inventors: Byeong Gyu Park, Gyeonggi-do (KR); Seung Gu Ji, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 128 days.

(21) Appl. No.: 16/150,716

(22) Filed: Oct. 3, 2018

(65) Prior Publication Data

US 2019/0303285 A1 Oct. 3, 2019

(30) Foreign Application Priority Data

Mar. 27, 2018 (KR) .................. 10-2018-0035333

(51) Int. Cl.
*G06F 12/02* (2006.01)
*G06F 3/06* (2006.01)

(52) U.S. Cl.
CPC .......... *G06F 12/0246* (2013.01); *G06F 3/061* (2013.01); *G06F 3/0631* (2013.01); *G06F 3/0658* (2013.01); *G06F 2212/7204* (2013.01)

(58) Field of Classification Search
CPC .... G06F 12/0246; G06F 3/061; G06F 3/0631; G06F 3/0658
See application file for complete search history.

(56) References Cited

U.S. PATENT DOCUMENTS

| | | | |
|---|---|---|---|
| 10,089,235 B1* | 10/2018 | Taylor | G06F 12/0246 |
| 2015/0149741 A1 | 5/2015 | Zhuo et al. | |
| 2015/0205717 A1* | 7/2015 | Lin | G06F 12/0246 711/103 |
| 2016/0117252 A1* | 4/2016 | Thangaraj | G06F 11/1068 711/118 |
| 2017/0083436 A1* | 3/2017 | Jung | G06F 12/0246 |
| 2018/0314643 A1 | 11/2018 | Park | |
| 2019/0004700 A1* | 1/2019 | Oshinsky | G06F 3/064 |

FOREIGN PATENT DOCUMENTS

| | | |
|---|---|---|
| KR | 1020110066697 | 6/2011 |
| KR | 1020170035155 | 3/2017 |

* cited by examiner

*Primary Examiner* — Tracy A Warren
(74) *Attorney, Agent, or Firm* — IP & T Group LLP

(57) ABSTRACT

The memory controller includes an unmap controller configured to receive unmap information from a host, calculate operation times required to perform a plurality of respective unmap operations based on the unmap information, and output an unmap command for an unmap operation having a relatively short operation time among the plurality of unmap operations as a result of the calculation; a buffer memory configured to store a plurality of types of address mapping information; and a control processor configured to control the unmap controller and the buffer memory in response to a command received from the host.

12 Claims, 10 Drawing Sheets

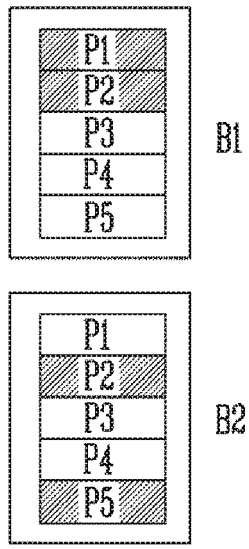

| L2 MAP | |
|---|---|
| IND | L2P |
| L2_1 | L2P_1 |
| L2_2 | L2P_2 |
| L2_3 | L2P_3 |
| L2_4 | L2P_4 |
| L2_5 | L2P_5 |

| L1 MAP | |
|---|---|
| IND | L2 |
| L1_1 | L2_1 |
| L1_2 | L2_2 |
| L1_3 | L2_3 |
| L1_4 | L2_4 |
| L1_5 | L2_5 |

| L0 MAP | |
|---|---|
| IND | L1 |
| L0_1 | L1_1 |
| L0_2 | L1_2 |
| L0_3 | L1_3 |
| L0_4 | L1_4 |
| L0_5 | L1_5 |

[ 2UM_OP : UM_WS = 2CA_R ]

[ 1UM_OP : MD_WS + UA_WS + L2P_WS = 1CA_R ]

… (1)

MEMORY CONTROLLER FOR PERFORMING UNMAP OPERATION AND MEMORY SYSTEM HAVING THE SAME

CROSS-REFERENCE TO RELATED APPLICATION

The present application claims priority under 35 U.S.C. § 119(a) to Korean patent application number 10-2018-0035333, filed on Mar. 27, 2018, which is incorporated herein by reference in its entirety.

BACKGROUND

1. Field of Invention

Various embodiments of the present disclosure generally relate to a memory controller and a memory system having the memory controller, and more particularly, to a memory controller capable of easily performing an unmap operation, and a memory system having the memory controller.

2. Description of Related Art

A memory system may include a storage device and a memory controller.

The storage device may include a plurality of memory devices. The memory devices may store data or output stored data therein. For example, the memory devices may be implemented with volatile memory devices in which data stored therein is lost when power supply is interrupted, or nonvolatile memory devices which can retain data stored therein even when power supply is interrupted.

The memory controller may control data communication between a host and the storage device.

The host may communicate with the memory device through the memory controller using an interface protocol such as a peripheral component interconnect-express (PCI-e or PCIe), an advanced technology attachment (ATA), a serial ATA (SATA), a parallel ATA (PATA), or a serial attached SCSI (SAS). The interface protocol provided for the purpose of data communication between the host and the memory system is not limited to the foregoing examples, and it may include various interface protocols such as a universal serial bus (USB), a multi-media card (MMC), to an enhanced small disk interface (ESDI), and integrated drive electronics (IDE).

SUMMARY

Various embodiments of the present disclosure provide a memory controller which performs an unmap operation in different schemes depending on an unmap update size so that the unmap operation time may be efficiently managed, and a memory system having the memory controller.

An embodiment of the present disclosure may provide for a memory controller including: an unmap controller configured to receive unmap information from a host, calculate operation times required to perform a plurality of respective unmap operations based on the unmap information, and output an unmap command for an unmap operation having a relatively short operation time among the plurality of unmap operations as a result of the calculation; a buffer memory configured to store a plurality of types of address mapping information; and a control processor configured to control the unmap controller and the buffer memory in response to a command received from the host.

An embodiment of the present disclosure may provide for a memory controller including: a calculator configured to receive unmap information, and output a first calculation result value and a second calculation result value based on the unmap information; an unmap determination unit configured to compare the first calculation result value to and the second calculation result value with each other and output a determination signal based on a result of the comparison; an unmap command output unit configured to output a first unmap command or a second unmap command in response to the determination signal; and a control processor configured to perform an unmap operation in response to the first unmap command or perform an unmap operation different from the unmap operation corresponding to the first unmap command in response to the second unmap command.

An embodiment of the present disclosure may provide for a memory system including: a memory controller configured to calculate times required to perform different unmap operations based on unmap request and unmap information received from a host, and control an update timing of mapping information based on a result of the calculation.

An embodiment of the present disclosure may provide for a memory system including: receiving, by a controller, unmap request and unmap information for erasing mapping information from a host; determining, by the controller, update sizes required to perform a plurality of respective unmap operations based on the unmap information; selecting, by the controller, an unmap operation having a relatively less update size among the plurality of unmap operations based on a result of the determination; and performing, by the controller, the selected unmap operation.

BRIEF DESCRIPTION OF THE DRAWINGS

FIG. 7 is a diagram illustrating an address mapping method in accordance with an embodiment of the present disclosure.

FIG. 8 is a diagram illustrating an L2P map and a P2L map in accordance with an embodiment of the present disclosure.

DETAILED DESCRIPTION

Figure 1:
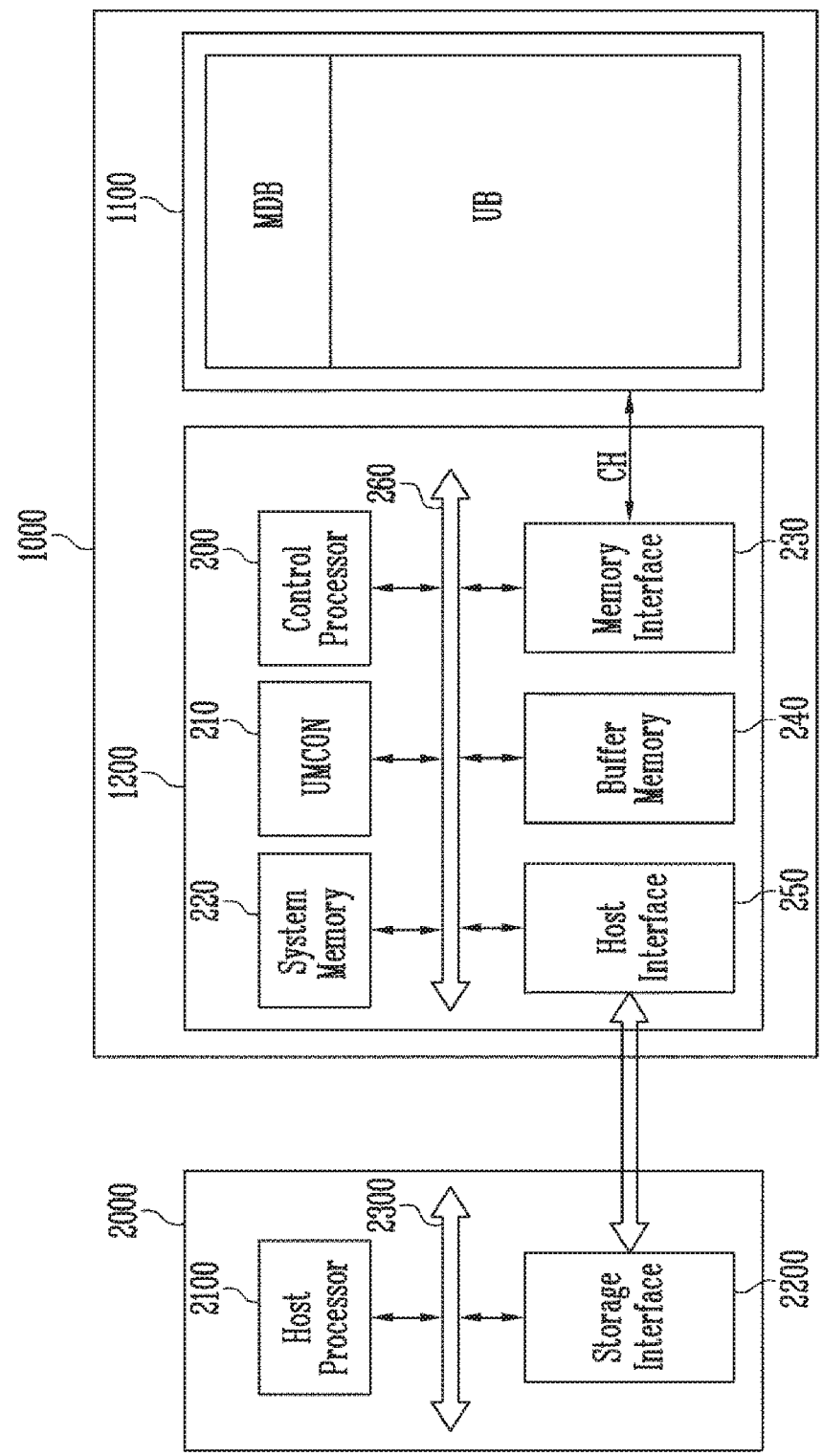
FIG. 1 is a diagram illustrating a memory system in accordance with an embodiment of the present disclosure.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present.

Hereinafter, embodiments will be described with reference to the accompanying drawings. Embodiments are described herein with to reference to cross-sectional illustrations that are schematic illustrations of embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as "first" and "second" may be used to describe various components, but they should not limit the various components. Those terms are only used for the purpose of differentiating a component from other components. For example, a first component may be referred to as a second component, and a second component may be referred to as a first component and so forth without departing from the spirit and scope of the present disclosure. Furthermore, "and/or" may include any one of or a combination of the components mentioned.

Furthermore, a singular form may include a plural from as long as it is not specifically mentioned in a sentence. Furthermore, "include/comprise" or "including/comprising" used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

It is also noted that in this specification, "connected/coupled" refers to one component not only directly coupling another component but also indirectly coupling another component through an intermediate component. On the other hand, "directly connected/directly coupled" refers to one component directly coupling another component without an intermediate component.

FIG. 1 is a diagram illustrating a memory system 1000 in accordance with an embodiment of the present disclosure.

Referring to FIG. 1, the memory system 1000 may include a memory device 1100 configured to store data, and a memory controller 1200 configured to communicate between the memory device 1100 and a host 2000.

The memory device 1100 may be implemented with a volatile memory device in which data stored therein is lost when power supply is interrupted, or a nonvolatile memory device which can retain data stored therein even when power supply is interrupted. In the following embodiments, a nonvolatile memory device will be described by way of example. The nonvolatile memory device may be a NAND flash memory device.

The memory device 1100 may communicate with the memory controller 1200 through a plurality of channels CH. For example, a command, an address, and data may be transmitted and received between the memory controller 1200 and the memory device 1100 through the channels CH. Although FIG. 1 illustrate that the memory system 1000 includes the single memory device 1100, the memory system 1000 may include a plurality of memory devices. In this case, the plurality of memory devices may be coupled with the memory controller 1200 through a plurality of channels.

The memory device 1100 may include a user block UB configured to store user data, and a metadata block MDB configured to store metadata. The user data may be data which may be programmed, read, or erased. The user data may be managed by a user who uses the memory system 1000. Rather than being managed by the user, the metadata may be used when an internal operation of the memory system 1000 is performed. For example, the metadata may include mapping information indicating mapping relations between logical addresses and physical addresses. The logical addresses may be managed by the host 2000, whereas the physical addresses may be managed by the memory device 1100.

The memory controller 1200 may include a control processor 200, an unmap controller (UMCON) 210, a system memory 220, a memory interface 230, a buffer memory 240, and a host interface 250.

The control processor 200 may perform various operations for to controlling the memory device 1100 or generate a command and an address. For example, the control processor 200 may control the unmap controller 210 to perform an unmap operation when an unmap request and unmap information are received from the host 2000. Furthermore, the control processor 200 may perform firmware for various operations. Here, the term "unmap operation" refers to an operation of erasing mapping information stored in the memory system 1000 in response to a request of the host 2000.

Under control of the control processor 200, the unmap controller 210 may check a logical block address included in the unmap information, and selectively output an unmap command for performing an unmap operation in different schemes depending on a result of the check.

The system memory 220 may store various types of information needed for the operation of the memory controller 1200. For example, mapping information such as an L0 map, an L1 map, and an L2 map may be stored in the system memory 220. In addition, information such as debugging information may be stored in the system memory 220. Here, L0 map, L1 map, and L2 map may include logical address mapping information. For example, the L0 map may include L1 mapping information, the L1 map may include L2 mapping information, and the L2 map may include L2P mapping information. The system memory 220 may be implemented with at least one or more of a random access memory (RAM), a dynamic RAM (DRAM), a static RAM (SRAM), a cache, and a tightly coupled memory (TCM). If a large amount of information is not able to be stored in the system memory 220 due to capacity limit, some information may be stored in the buffer memory 240.

The memory interface 230 may exchange a command, an address, and data between the memory controller 1200 and the memory device 1100. For example, the memory interface 230 may transmit a command, an address, and data to the memory device 1100 through the channels CH, and receive data from the memory device 1100 through the channels CH. Here, the command may be an internal command, and the address may be a logical address.

The buffer memory 240 may temporarily store data to be used when the memory system 1000 performs an operation. For example, during a program operation, the buffer memory 240 may temporarily store original program data until the program operation for the memory device 1100 passes. During a read operation, the buffer memory 240 may temporarily store data read from the memory device 1100 and then sequentially transmit the data to the host interface 250. The buffer memory 240 may store address maps. The buffer memory 240 having the foregoing functions may be implemented with a DRAM.

The host interface 250 may exchange a command, an address, and data between the memory controller 1200 and the host 2000. For example, the host interface 250 may receive a command, an address, data from the host 2000 and transmit data to the host 2000. Here, the command may be an external command, and the address may be a physical address.

The control processor 200, the unmap controller 210, the system memory 220, the memory interface 230, the buffer memory 240, and the host interface 250 may communicate with each other through a bus 260.

The host 2000 may include a host processor 2100 and a storage interface 2200. The host processor 2100 and the storage interface 2200 may communicate with each other through a bus 2300.

The host processor 2100 may output a program request for controlling a program operation of the memory system 1000, a read request for controlling a read operation of the memory system 1000, an erase request for controlling an erase operation of the memory system 1000, and an unmap request for erasing data stored in the memory system 1000. When outputting an unmap request, the host processor 2100 may output a logical block address (LBA) corresponding to target data to be erased. The host processor 2100 may output other requests for operations as well as the above-mentioned requests.

The storage interface 2200 may use, to communicate with the memory system 1000, an interface protocol such as a peripheral component interconnect-express (PCI-e or PCIe) protocol, an advanced technology attachment (ATA) protocol, a serial ATA (SATA) protocol, a parallel ATA (PATA) protocol, a serial attached SCSI (SAS) protocol, or a non-volatile memory express (NVMe) protocol. The storage interface 2200 is not limited to the foregoing examples, and it may include various interface protocols such as a universal serial bus (USB), a multi-media card (MMC), an enhanced small disk interface (ESDI), and integrated to drive electronics (IDE).

Figure 2:
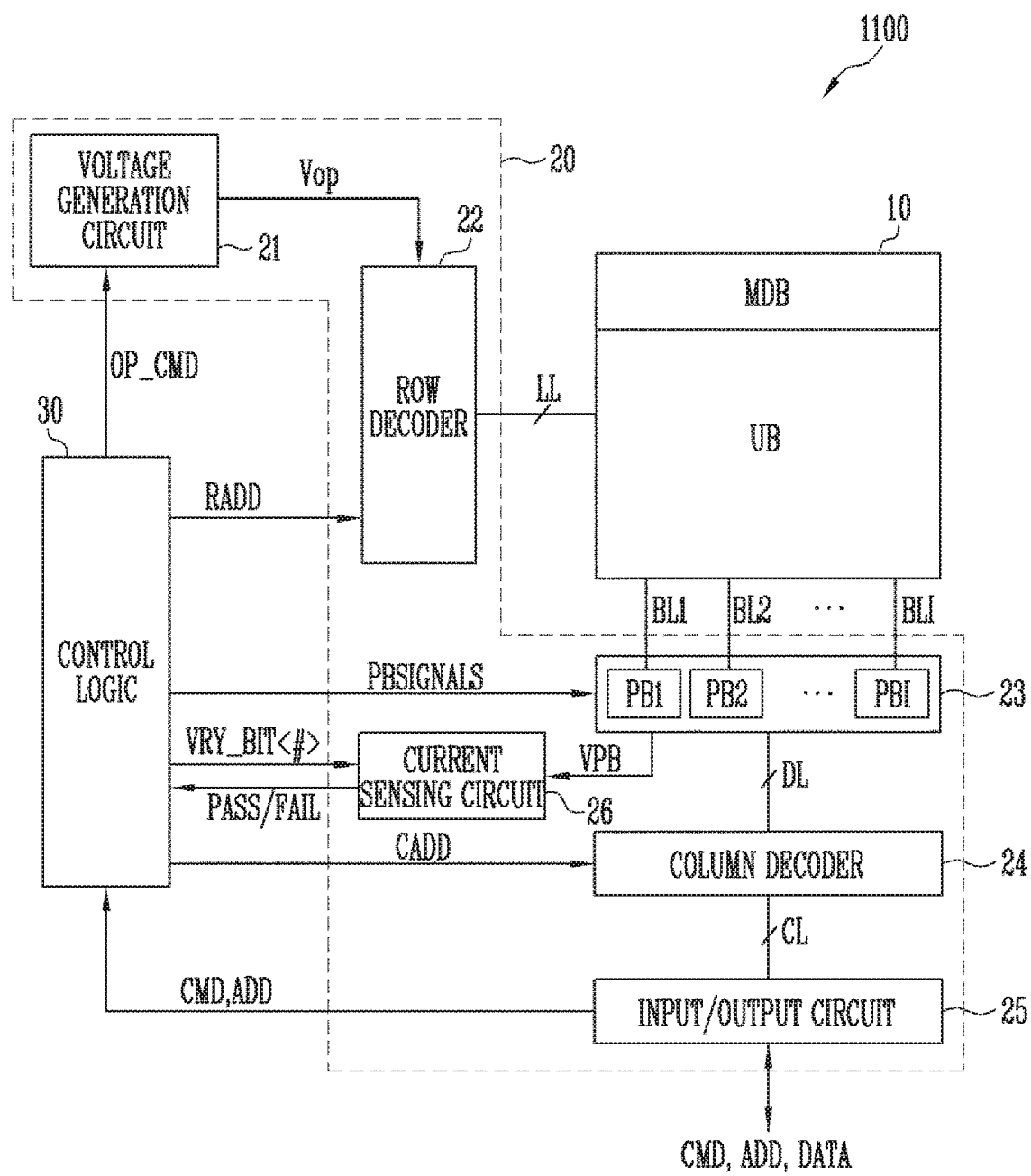
FIG. 2 is a diagram illustrating a memory device in accordance with an embodiment of the present disclosure.

FIG. 2 is a diagram illustrating a memory device in accordance with an embodiment of the present disclosure, for example, the memory device 1100 of FIG. 1.

Referring to FIG. 2, the memory device 1100 may include a memory cell array 10 configured to store data. The memory device 1100 may include a peripheral circuit 20 configured to perform a program operation for storing data in the memory cell array 10, a read operation for outputting the stored data of the memory cell array 10, and an erase operation for erasing the stored data of the memory cell array 10. The memory device 1100 may include a control logic 30 configured to control the peripheral circuit 20 under control of an external device, for example, the memory controller 1200 of FIG. 1.

The memory cell array 10 may include a plurality of memory blocks. Some of the memory blocks may be used as the user block UB, and the other memory blocks of the memory blocks may be used as the metadata block MDB. The user block UB and the metadata block MDB may be embodied in a two-dimensional (2D) or three-dimensional (3D) structure. For example, each of the memory blocks having a two-dimensional structure may include memory cells which are arranged parallel to a substrate of the memory device 1100. Each of the memory blocks having a three-dimensional structure may include memory cells which are arranged perpendicular to a substrate of the memory device 1100. The metadata block MDB may store mapping information. During a first unmap operation, the mapping information of the metadata block MDB may be updated. Although user data to be stored is mainly stored in the user block UB, unmap information may be stored in some memory blocks included in the user block UB. At least one memory block may be used as a block for storing unmap information. During a second unmap operation, the unmap information is written to the user block UB. The unmap information written to the user block UB may be erased after the mapping information in the metadata block MDB has been updated.

The peripheral circuit 20 may perform a program operation, a read operation, and an erase operation under control of the control logic 30. For example, the peripheral circuit 20 may include a voltage generation circuit 21, a row decoder 22, a page buffer group 23, a column decoder 24, an input and output (input/output) circuit 25, and a current sensing circuit 26.

The voltage generating circuit 21 may generate various operating voltages Vop to be used for a program operation, a read operation, and an erase operation in response to an operating signal OP_CMD from the control logic 30. For example, the voltage generation circuit 21 may generate a program voltage, a verify voltage, a pass voltage, a compensation program voltage, a read voltage, an erase voltage, and a turn-on voltage under control of the control logic 30.

The row decoder 22 may transmit, in response to a row address RADD from the control logic 30, operating voltages Vop to local lines LL coupled to a selected one of the memory blocks of the memory cell array 10. The local lines LL may include local word lines, local drain select lines, and local source select lines. In addition, the local lines LL may include various lines such as a source line coupled to the memory blocks.

The page buffer group 23 may be coupled to bit lines BL1 to BLI coupled to the memory blocks of the memory cell array 10. The page buffer group 23 may include a plurality of page buffers PB1 to PBI coupled to the bit lines BL1 to BLI. The page buffers PB1 to PBI may operate in response to page buffer control signals PBSIGNALS from the control logic 30. For instance, the page buffers PB1 to PBI may temporarily store data received from the memory cell array 10 through the bit lines BL1 to BLI or sense voltages or currents of the bit lines BL1 to BLI during a read operation or a verify operation.

The column decoder 24 may transmit and receive data between the input/output circuit 25 and the page buffer group 23 in response to a column address CADD from the control logic 30. For example, the column decoder 24 may exchange data with the page buffers PB through data lines DL or exchange data with the input/output circuit 25 through column lines CL.

The input/output circuit 25 may transmit a command CMD or an address ADD received from an external device, for example, the memory controller 1120 of FIG. 1 to the control logic 30, or exchange data DATA with the column decoder 24.

During a read operation or a verify operation, the current sensing circuit 26 may generate a reference current in response to an allowable to bit VRY_BIT<#> from the control logic 30, and may compare a sensing voltage VPB received from the page buffer group 23 with a reference voltage generated by the reference current. Based on the comparison result, the current sensing circuit 26 may output a pass signal PASS or a fail signal FAIL.

The control logic 30 may output the operating signal OP_CMD, the row address RADD, the page buffer control signals PBSIGNALS, and the allowable bit VRY_BIT<#> in response to a command CMD and an address ADD, and thus control the peripheral circuit 20. The control logic 30 may determine whether a verify operation has passed or failed, in response to the pass signal PASS or the fail signal FAIL of the current sensing circuit 26. Furthermore, the control logic 30 may control the peripheral circuit 20 to perform an unmap operation in response to an unmap command. In various embodiments, the control logic 30 may control the peripheral circuit 20 to perform a first unmap operation in response to a first unmap command, and may control the peripheral circuit 20 to perform a second unmap operation in response to a second unmap command.

Figure 3:
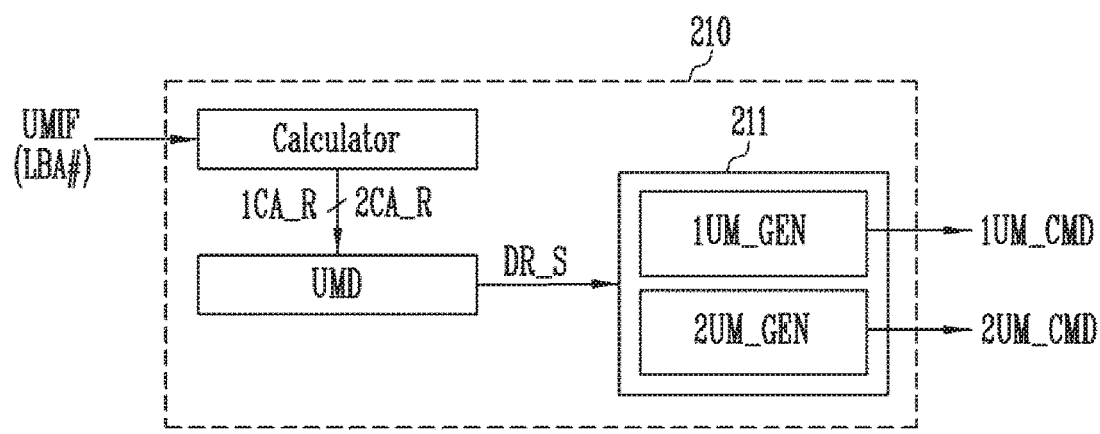
FIG. 3 is a diagram illustrating an unmap controller in accordance with an embodiment of the present disclosure.

FIG. 3 is a diagram illustrating an unmap controller in accordance with an embodiment of the present disclosure, for example, the unmap controller (UMCON) 210 of FIG. 1.

Referring to FIG. 3, the unmap controller 210 may receive unmap information UMIF, process the received unmap information UMIF by performing a calculation operation (will be explained hereinafter), and to then output a first or second unmap command 1UM_CMD or 2UM_CMD based on the result of the calculation. To this end, the unmap controller 210 may include a calculator, an unmap determination unit UMD, and an unmap command output unit 211.

The calculator may perform a calculation operation based on a logical block address LBA # included in the unmap information UMIF, and output a first calculation result value 1CA_R and a second calculation result value 2CA_R based on the result of the calculation. For example, the calculator may output the first and second calculation result values 1CA_R and 2CA_R depending on the number of received logical block addresses LBA #. A method of outputting the first and second calculation result values 1CA_R and 2CA_R depending on the number of received logical block addresses LBA # will be described in detail later herein.

The unmap determination unit UMD may receive the first and second calculation result values 1CA_R and 2CA_R and output a determination signal DR_S based on the first and second calculation result values 1CA_R and 2CA_R. For example, the unmap determination unit UMD may compare the size of the first calculation result value 1CA_R with the size of the second calculation result value 2CA_R, and output a determination signal DR_S having a logic high or low level depending on the result of the comparison.

The unmap command output unit 211 may receive the determination signal DR_S and output a first unmap command 1UM_CMD or a second unmap command 2UM_CMD in response to the determination signal DR_S. For this operation, the unmap command output unit 211 may include a first unmap command output unit 1UM_GEN and a second unmap command output unit 2UM_GEN. For instance, if the determination signal DR_S has a logic high level, the first unmap command output unit 1UM_GEN may output the first unmap command 1UM_CMD. If the determination signal DR_S has a logic low level, the second unmap command output unit 2UM_GEN may output the second unmap command 2UM_CMD. The first and second unmap command output units 1UM_GEN and 2UM_GEN are not simultaneously operated.

Figure 4:
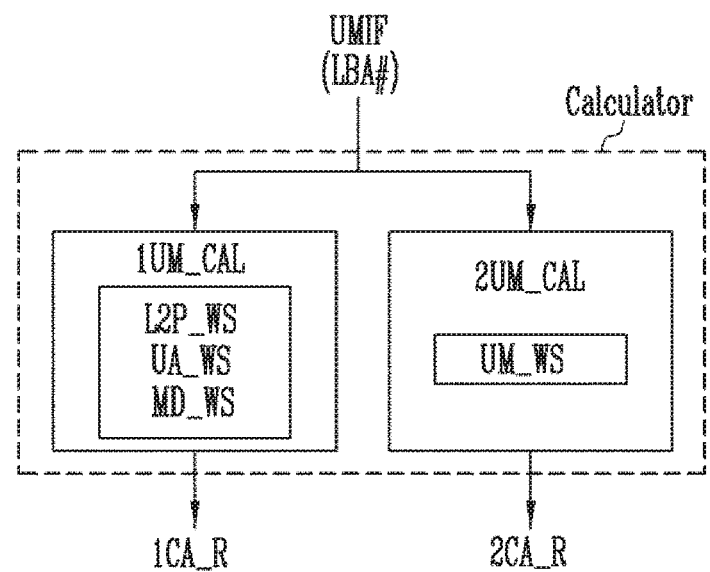
FIG. 4 is a diagram illustrating a calculator in accordance with an embodiment of the present disclosure.

FIG. 4 is a diagram illustrating a calculator in accordance with an embodiment of the present disclosure, for example, the calculator of FIG. 3.

Referring to FIG. 4, the calculator may receive unmap information UMIF and output first and second calculation result values 1CA_R and 2CA_R in response to the unmap information UMIF. For this operation, the calculator may include a first unmap calculator 1UM_CAL and a second unmap calculator 2UM_CAL.

The first and second unmap calculators 1UM_CAL and 2UM_CAL may receive in common the unmap information UMIF from the host 2000, but may perform different calculation operations. For example, the first unmap calculator 1UM_CAL may preliminarily calculate a mapping information update size of a first unmap operation based on the unmap information UMIF, and output a first unmap result value 1CA_R. The second unmap calculator 2UM_CAL may preliminarily calculate a mapping information update size of a second unmap operation based on the unmap information UMIF, and output a second unmap result value 2CA_R.

When the first unmap operation is performed based on the unmap information UMIF, the first unmap calculator 1UM_CAL may preliminarily calculate the amount of mapping information to be updated on the memory device 1100, and output it as the first unmap result value 1CA_R.

When the second unmap operation is performed based on the unmap information UMIF, the second unmap calculator 2UM_CAL may preliminarily calculate the amount of unmap information to be written to the memory device 1100, and output it as the second unmap result value 2CA_R.

In other words, the first and second unmap calculators 1UM_CAL and 2UM_CAL may preliminarily calculate, in different schemes, the size of information to be updated on the memory device 1100. For example, the first and second unmap calculators 1UM_CAL and 2UM_CAL may respectively calculate an update size of the first unmap operation and an update size of the second unmap operation, depending on the number of logical block addresses LBA # included in the unmap information UMIF, and output first and second calculation result values 1CA_R and 2CA_R.

The first unmap calculation unit 1UM_CAL may output, as the first calculation result value 1CA_R, the sum of an L2P mapping write size L2P_WS, an upper mapping address write size UA_WS, and a metadata write size MD_WS, based on the unmap information UMIF. For example, in the first unmap operation, if the unmap information UMIF is received, to all of the metadata block, the L0 map, the L1 map, and the L2P map may be updated. Here, the update size of the metadata block may become the metadata write size MD_WS, the update size of the L0 and L1 maps may become the upper mapping address write size UA_WS, and the update size of the L2P map may become the L2P mapping write size L2P_WS.

The second unmap calculator 2UM_CAL may output a value corresponding to the unmap write size UM_WS as the second calculation result value 2CA_R. For example, in the second unmap operation, if the unmap information UMIF is received, the mapping information may not be immediately updated, and the entirety of the unmap information UMIF may be written to the user block. Since the mapping information may be updated later at one time based on the unmap information UMIF written to the user block, the size of the unmap information UMIF to be written to the user block may be outputted as the second calculation result value 2CA_R.

Figure 5:
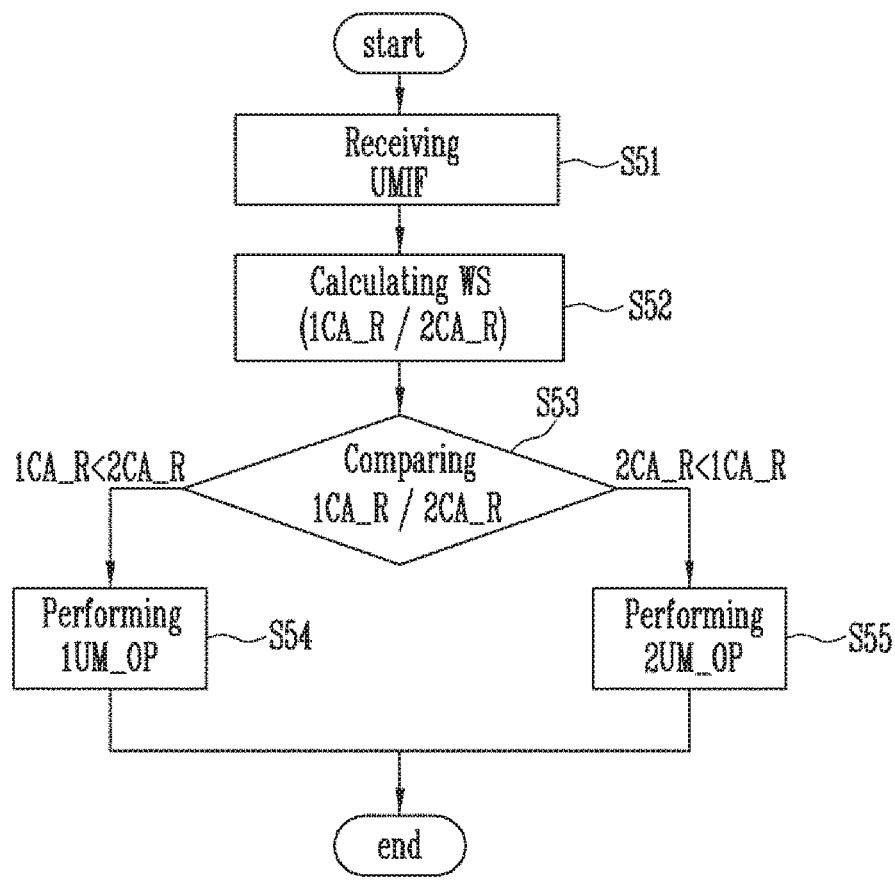
FIG. 5 is a flowchart illustrating an unmap operation in accordance with an embodiment of the present disclosure.

FIG. 5 is a flowchart illustrating an unmap operation in accordance with an embodiment of the present disclosure.

Referring to FIG. 5, if the unmap operation starts, the host 2000 of FIG. 1 may transmit an unmap request and unmap information UMIF to the memory system 1000 of FIG. 1. At step S51, when the memory controller 1200 of FIG. 1 of the memory system receives the unmap request and the unmap information UMIF, the control processor 200 of FIG. 1 of the memory controller 1200 may transmit the unmap to information UMIF to the unmap controller 210 of FIG. 1.

At step S52, the calculator of the unmap controller 210 in FIG. 3 may calculate an expected write size (WS) for each of different unmap operations, based on the unmap information UMIF, and generate first and second calculation result values 1CA_R and 2CA_R.

At step S53, the unmap determination unit UMD may compare the sizes of the first and second calculation result values 1CA_R and 2CA_R with each other and output a determination signal DR_S.

As the result of the comparison of step S53, if the first calculation result value 1CA_R is less than the second calculation result value 2CA_R (i.e., 1CA_R<2CA_R), at step S54, the first unmap output unit 1UM_GEN may output a first unmap command 1UM_CMD, and the memory device 1100 may perform a first unmap operation in response to the first unmap command 1UM_CMD. We note that the first calculation result value 1CA_R is less than the second calculation result value 2CA_R when the time it takes to perform the first unmap operation is shorter than the time it takes to perform the second unmap operation. Therefore, the first unmap command output unit 1UM_GEN may output the first unmap command 1UM_CMD so that the first unmap operation can be performed in the memory device 1100.

As the result of the comparison of step S53, if the second calculation result value 2CA_R is less than the first calculation result value 1CA_R (i.e., 2CA_R<1CA_R), at step S55, the second unmap output unit 2UM_GEN may output a second unmap command 2UM_CMD, and the memory device 1100 may perform a second unmap operation in response to the second unmap command 2UM_CMD. We note that the second calculation result value 2CA_R is less than the first calculation result value 1CA_R when the time it takes to perform the second unmap operation is shorter than the time it takes to perform the first unmap operation. Therefore, the second unmap command output unit 2UM_GEN may output the second unmap command 2UM_CMD so that the second unmap operation can be performed in the memory device 1100.

Figure 6:
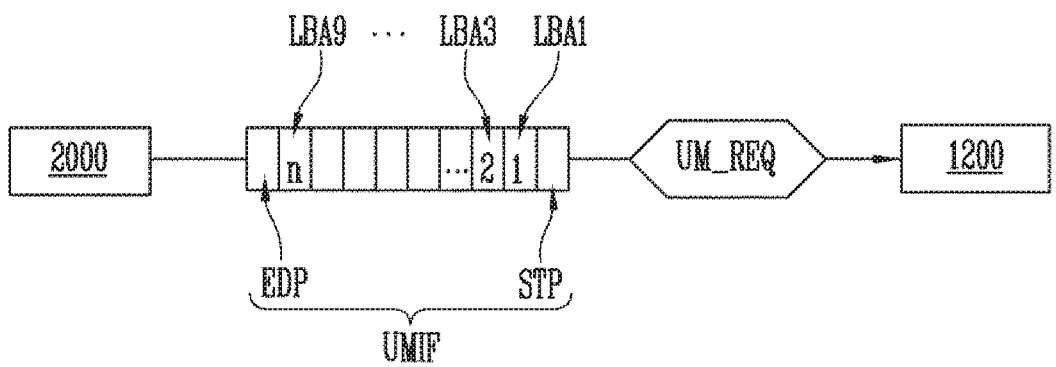
FIG. 6 is a diagram illustrating unmap information in accordance with an embodiment of the present disclosure.

FIG. 6 is a diagram illustrating unmap information in accordance with an embodiment of the present disclosure.

Referring to FIG. 6, to perform an unmap operation, the host 2000 of FIG. 1 may transmit an unmap request UM_REQ and unmap information UMIF to the memory controller 1200.

The unmap information UMIF may include at least one or more logical block addresses. For example, FIG. 6 illustrates unmap information UMIF including nine logical block addresses LBA1 to LBA9. However, the number of logical block addresses may be determined depending on the number of blocks to be erased by the host 2000. Furthermore, the unmap information UMIF may include a start point STP and an end point EDP. For example, the start point STP of the unmap information UMIF may be first inputted to the memory controller 1200, the logical block addresses LBA1 to LBA9 may be thereafter sequentially inputted to the memory controller 1200, and then the end point EDP may be lastly inputted to the memory controller 1200.

The memory controller 1200 may determine the number of logical block addresses LBA1 to BLA9 by using only the start point STP and the end point EDP included in the unmap information UMIF. For example, the calculator of FIG. 4 may receive the start point STP the logical block addresses LBA1 to LBA9, and the end point EDP, and determine the number of received logical block addresses LBA1 to LBA9 by calculating a difference between the start point STP and the end point EDP. In an embodiment, the first and second unmap calculators 1UM_CAL and 2UM_CAL included in the calculator may simultaneously calculate the difference between the start point STP and the end point EDP and thus determine the number of logical block addresses LBA1 to LBA9. In other words, the first and second unmap calculators 1UM_CAL and 2UM_CAL may calculate in common the number of logical block addresses LBA1 to LBA9, and separately determine write sizes in different calculation schemes based on the calculated value.

Alternatively, although the start point STP and the end point EDP are not included in the unmap information UMIF, the first and second unmap calculators 1UM_CAL and 2UM_CAL may calculate the update size by counting the number of received logical block addresses LBA1 to LBA9.

FIG. 7 is a diagram illustrating an address mapping method for a memory device, for example, the memory device 1100 of FIG. 1, in accordance with an embodiment of the present disclosure. In FIG. 7, by way of example, it is illustrated that a NAND flash memory device as the memory device 1100 includes two blocks B1 and B2.

Referring to FIG. 7, in the NAND flash memory device, memory cells may be operated on a page basis. Hence, a plurality of pages P1 to P5 may be included in each of the first block B1 and the second block B2. In FIG. 7, for the sake of understanding, each of the first and second blocks B1 and B2 has been illustrated as including five pages, but the number of pages may change depending on the memory device 1100.

As shown in FIG. 7, it is assumed that data is stored in first and second pages P1 and P2 of the first block B1 and in second and fourth pages P2 and P5 of the second block B2. In this case, physical addresses in which the data is stored may be B1/P1, B1/P2, B2/P2, and B2/P5. In other words, the term "B1/P1" may refer to a physical address of the first page P1 of the pages included in the first block B1. The term "B2/P5" may refer to a physical address of the fifth page P5 of the pages included in the second block B2.

Addresses which are managed by the host 2000 of FIG. 1 differ from addresses which are managed by the memory device 1100. For example, the addresses that are managed by the host 2000 may be defined as logical addresses, and the addresses that are managed by the memory device 1100 may be defined as physical addresses. Therefore, the memory controller 1200 may map the logical addresses and the physical addresses with respect to each other, and store mapping information between the logical addresses and the physical addresses in the memory device 1100. As the storage capacity of the memory device 1100 is increased, the number of blocks for storing data is also increased. Thereby, the number of physical addresses is increased. The number of logical addresses also increases by an increase in the number of physical addresses. Consequently, it may be difficult to manage the mapping information using a single address entry. Given this, the memory controller 1200 may classify and manage the logical addresses in various schemes. Various address maps will be described as follows.

FIG. 8 is a diagram illustrating a logical-to-physical (L2P) map and a physical-to-logical (P2L) map in accordance with an embodiment of the present disclosure.

Referring to FIG. 8, the L2P map may include information about physical addresses corresponding to logical addresses. The P2L map may include information about logical addresses corresponding to physical addresses.

The L2P map may include a table in which a plurality of indexes IND and physical address PADD respectively correspond to each other. Here, the indexes IND may refer to logical block addresses LBA1 to LBA5. For example, if a fourth index IND is LBA4, then B1/P5 corresponding to LBA4 may be selected. "B1/P5" may refer to a physical address of the fifth page P5 of the pages included in the first block B1 of the memory device 1100. Here, the logical block addresses may be addresses included in the logical addresses that are managed by the host 2000.

The P2L map may include a table in which a plurality of indexes IND and respective corresponding logical addresses. Here, the indexes IND may refer to physical addresses. For example, if a second index IND to is B1/P2, a logical address LBA2 corresponding to B1/P2 may be selected.

Figures 9, 10:
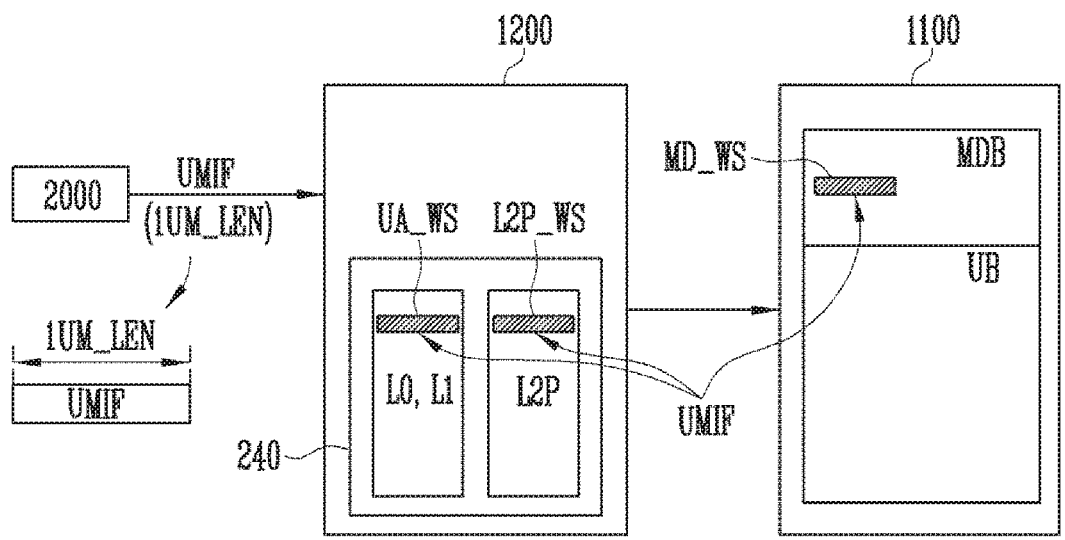
FIG. 9 is a diagram illustrating an L2 map, an L1 map, and an L0 map in accordance with an embodiment of the present disclosure.
FIGS. 10 and 11 are diagrams illustrating a first unmap operation in accordance with an embodiment of the present disclosure.

FIG. 9 is a diagram illustrating an L2 map, an L1 map, and an L0 map in accordance with an embodiment of the present disclosure.

Referring to FIG. 9, the L2 map may include a table including L2P map addresses L2P_1 to L2P_5 corresponding to respective indexes L2_1 to L2_5. For example, a plurality of L2P maps described with reference to FIG. 8 may be present. In this case, an L2P map including a logical block address LBA to be selected may be searched for using the L2 map.

The L1 map may include a table including L2 map addresses L2_1 to L2_5 corresponding to respective indexes L1_1 to L1_5. For example, a plurality of L2 maps may be present. In this case, an L2 map including a logical block address LBA to be selected may be searched for using the L1 map.

The L0 map may include a table including L1 map addresses L1_1 to L1_5 corresponding to respective indexes L0_1 to L0_5. For example, a plurality of L1 maps may be present. In this case, an L1 map including a logical block address LBA to be selected may be searched for using the L0 map.

Although, for the sake of understanding, a logical block address has been expressed as 'LBA' in FIG. 6, each LBA included in the unmap information UMIF may substantially include address information of the L0, L1, L2, and L2P maps described with reference to FIGS. 8 and 9.

Figure 11:
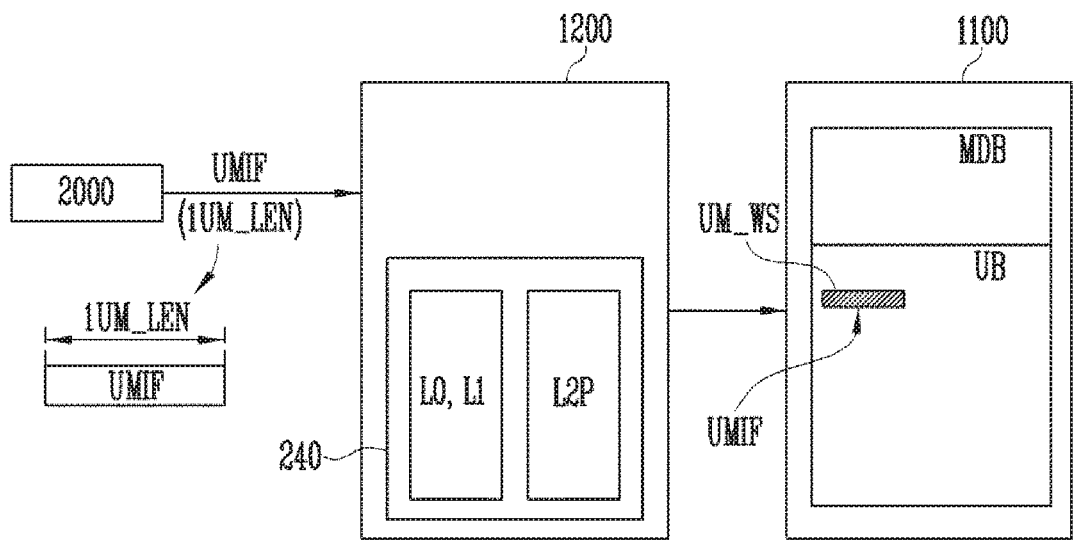
Figure 12:
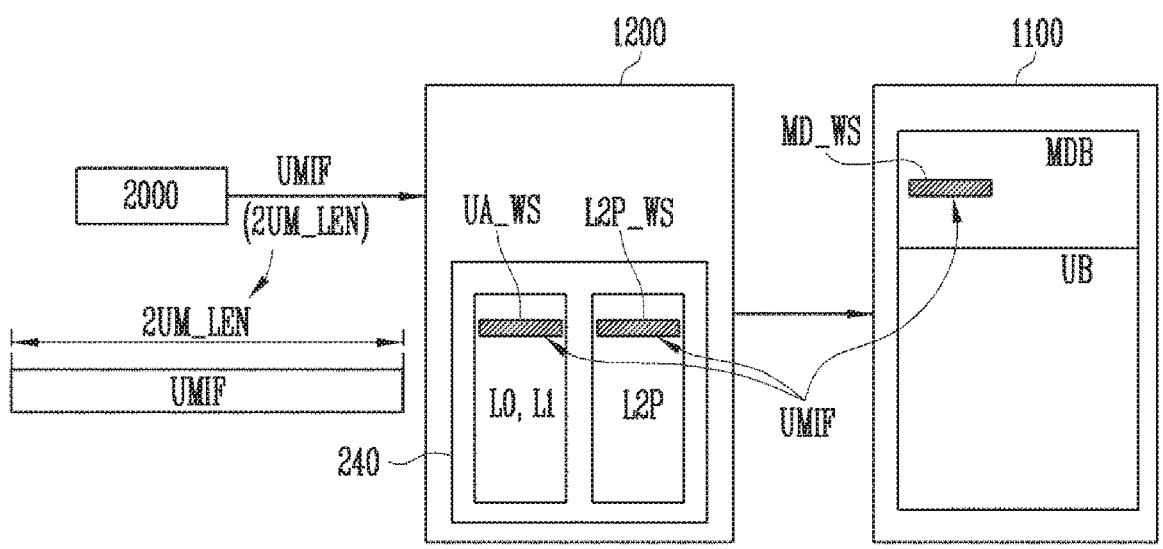
FIGS. 12 and 13 are diagrams illustrating a second unmap operation in accordance with an embodiment of the present disclosure.
Figure 13:
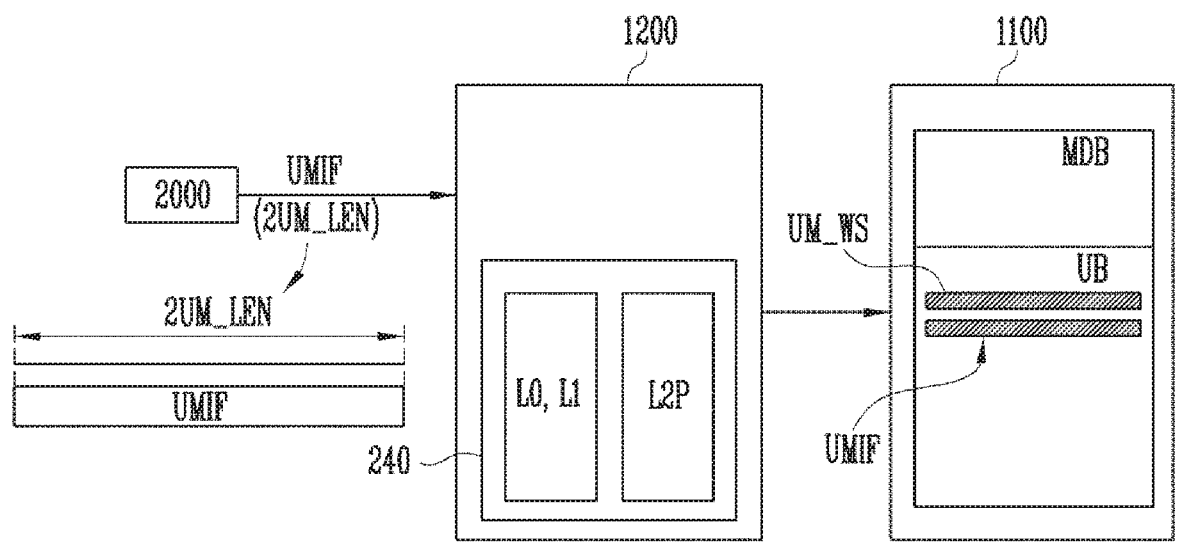

FIGS. 10 and 12 are diagrams illustrating the first unmap operation in accordance with an embodiment of the present disclosure. FIGS. 11 and 13 are diagrams illustrating the second unmap operation in accordance with an embodiment of the present disclosure.

The descriptions in FIGS. 10 and 11 assume that the length of unmap information UMIF received from the host 2000 is a first unmap length 1UM_LEN. The descriptions in FIGS. 12 and 13 assume that the length of unmap information UMIF is a second unmap length 2UM_LEN greater than the first unmap length 1UM_LEN.

If unmap information UMIF having a first unmap length 1UM_LEN is received from the host 2000, the memory controller 1200 may calculate respective update sizes of the first unmap operation 1UM_OP and the second unmap operation 2UM_OP based on the first unmap length 1UM_LEN.

Referring to FIG. 10, in the first unmap operation 1UM_OP, if the unmap information UMIF is received, mapping information corresponding to the unmap information UMIF may be immediately updated. For example, based on the unmap information UMIF, the mapping information may be updated on the metadata block MDB of the memory device 1100 and the buffer memory 240 or the system memory 220 of the memory controller 1200. The mapping information of all of the L0 map (L0), the L1 map (L1), and the L2P map (L2P) may be updated on the buffer memory 240 or the system memory 220. Although in the drawing the L0 map (L0), the L1 map (L1), and the L2P map (L2P) have been illustrated as being stored in the buffer memory 240, they may be stored in the system memory 220, as described above. The to update size of the metadata block MDB is a metadata write size MD_WS. The update size of the L0 map (L0) and the L1 map (L1) is an upper mapping address write size UA_WS. The update size of the L2P map (L2P) is an L2P mapping write size L2P_WS. In addition, a size of information which is updated immediately when the unmap information UMIF is received may be added.

Since in the first unmap operation 1UM_OP the mapping information of all of the metadata block MDB, the L0 map (L0), the L1 map (L1), and the L2P map (L2P) is updated, the sum of the metadata write size MD_WS, the upper mapping address write size UA_WS, and the L2P mapping write size L2P_WS may be calculated as the first calculation result value 1CA_R.

Referring to FIG. 11, in the second unmap operation 2UM_OP, if the unmap information UMIF is received, all the unmap information UMIF may be written to the user block UB of the memory device 1100. In other words, the mapping information corresponding to the unmap information UMIF is not immediately updated on the memory controller 1200 and the metadata block MDB of the memory device 1100, and the unmap information UMIF may be preferentially written to the user block UB of the memory device 1100. The mapping information corresponding to the unmap information UMIF written to the user block UB of the memory device 1100 may be updated on the memory controller 1200 and the metadata block MDB of the memory device 1100 later. For example, if the capacity allocated in a designated user block UB to store the unmap information UMIF is filled or an unmap update command is received, the memory controller 1200 may update the metadata block MDB, the L0 map (L0), the L1 map (L1), and the L2P map (L2P) at one time based on the unmap information UMIF written in the user block UB of the memory device 1100. In other words, in the second unmap operation 2UM_OP, the metadata block MDB, the L0 map (L0), the L1 map (L1), and the L2P map (L2P) are updated later at one time rather than being immediately updated. Therefore, the size of the unmap information UMIF to be written to the user block UB may become the unmap write size UM_WS, and the unmap write size UM_WS may be calculated as the second calculation result value 2CA_R.

Referring to FIG. 12, if the length of the unmap information UMIF is the second unmap length 2UM_LEN greater than the first unmap length 1UM_LEN, in the first unmap operation 1UM_OP, the mapping information corresponding to the unmap information UMIF may be immediately updated on the metadata block MDB of the memory device 1100 and the buffer memory 240 or the system memory 220 of the memory controller 1200. As the length of the unmap information UMIF is increased, the update sizes of the metadata block MDB of the memory device 1100 and the L0 map (L0), the L1 map (L1), and the L2P map (L2P) of the memory controller 1200 may also increase. However, since an allocated bit is given in the metadata block MDB, the L0 map (L0), the L1 map (L1), and the L2P map (L2P) according to each LBA, there may be no significant difference between the first calculation result value 1CA_R of the second unmap operation 2UM_OP and the first calculation result value 1CA_R of the first unmap operation 1UM_OP.

Referring to FIG. 13, in the second unmap operation 2UM_OP, if the unmap information UMIF is received, all the unmap information UMIF may be written to the user block UB of the memory device 1100, so that the unmap write size UM_WS may increase in proportion to the size of the unmap information UMIF.

For example, in the second unmap operation 2UM_OP, the mapping information corresponding to the unmap information UMIF received from the host 200 may be preferentially written to the designated user block UB of the memory device 1100. Here, the size of the unmap information UMIF written to the user block UB becomes the unmap write size UM_WS. With regard to the unmap information UMIF written to the user block UB, if the capacity allocated in the user block UB to store the unmap information UMIF is filled or an unmap update command is received from the memory controller 1200, the metadata block MDB, the L0 map (L0), the L1 map (L1), and the L2P map (L2P) may be updated at one time. In other words, in the second unmap operation 2UM_OP, the metadata block MDB, the L0 map (L0), the L1 map (L1), and the L2P map (L2P) are updated later at one time rather than being immediately updated. Therefore, the unmap write size UM_WS may be calculated as the second calculation result value 2CA_R.

As described with reference to FIGS. 10 to 13, the first calculation result value 1CA_R that is the total update size of the first to unmap operation 1UM_OP may differ from the second calculation result value 2CA_R that is the update size of the second unmap operation 2UM_OP, depending on the length of the unmap information UMIF. Therefore, depending on the unmap information UMIF, the first calculation result value 1CA_R may be less than the second calculation result value 2CA_R, or the first calculation result value 1CA_R may be greater than the second calculation result value 2CA_R. In other words, the smaller the update size the shorter the update operation time, so that an unmap operation 1UM_OP or 2UM_OP having a comparatively short update operation time depending on the unmap information UMIF may be selectively performed.

To this end, the memory controller 1200 may compare the first calculation result value 1CA_R and the second calculation result value 2CA_R with each other, and perform an unmap operation corresponding to a result value having a comparatively small size.

As described above, on an unmap request, based on the number of logical addresses corresponding to targets to be unmapped, the time it takes to perform each of the first and second unmap operations 1UM_OP and 2UM_OP may be calculated. Thereafter, an unmap operation having a comparatively short unmap operation time may be selectively performed, whereby the unmap operation may be efficiently managed.

Figure 14:
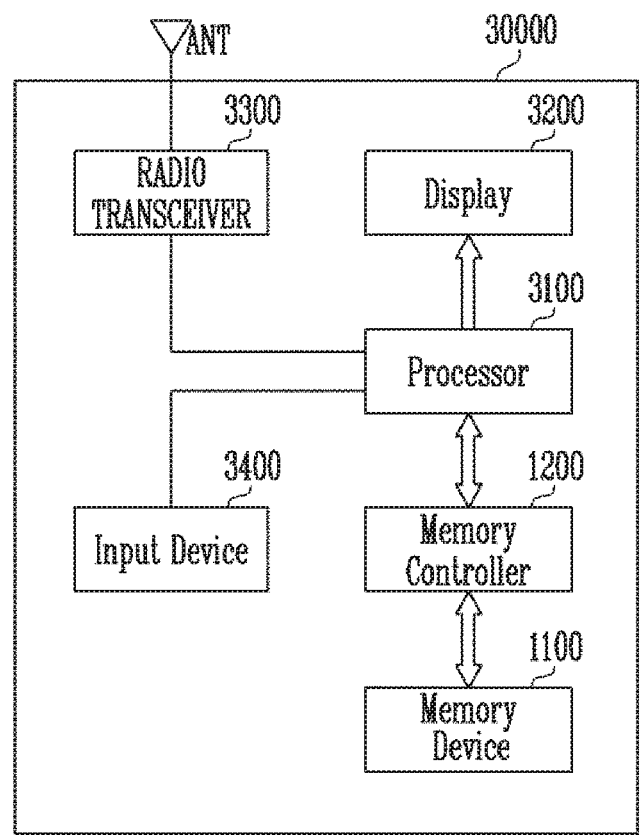
FIG. 14 is a diagram illustrating an example of a memory system including a memory controller in accordance with an embodiment of the to present disclosure.

FIG. 14 is a diagram illustrating an example of a memory system 30000 including a memory controller in accordance with an embodiment of the present disclosure, for example, the memory controller 1200 shown in FIG. 1.

Referring to FIG. 14, the memory system 30000 may be embodied in a cellular phone, a smartphone, a tablet personal computer (PC), a personal digital assistant (PDA) or a wireless communication device. The memory system 30000 may include a memory device 1100, and the memory controller 1200 capable of controlling the operation of the memory device 1100. The memory controller 1200 may control a data access operation, e.g., a program operation, an erase operation, or a read operation, of the memory device 1100 under control of a processor 3100.

Data programmed in the memory device 1100 may be output through a display 3200 under control of the memory controller 1200.

A radio transceiver 3300 may transmit and receive radio signals through an antenna ANT. For example, the radio transceiver 3300 may change a radio signal received through the antenna ANT into a signal capable of being processed in the processor 3100. Therefore, the processor 3100 may process a signal output from the radio transceiver 3300 and transmit the processed signal to the memory controller 1200 or the display 3200. The memory controller 1200 may transmit a signal processed by the processor 3100 to the memory device 1100. Furthermore, the radio transceiver 3300 may change a signal output from the processor 3100 into a radio signal, and output the changed radio to signal to an external device through the antenna ANT. An input device 3400 may be used to input a control signal for controlling the operation of the processor 3100 or data to be processed by the processor 3100. The input device 3400 may be embodied in a pointing device such as a touch pad and a computer mouse, a keypad or a keyboard. The processor 3100 may control the operation of the display 3200 such that data outputted from the memory controller 1200, data outputted from the radio transceiver 3300, or data outputted form the input device 3400 is outputted through the display 3200.

In an embodiment, the memory controller 1200 capable of controlling the operation of the memory device 1100 may be embodied as a part of the processor 3100 or a chip provided separately from the processor 3100.

Figure 15:
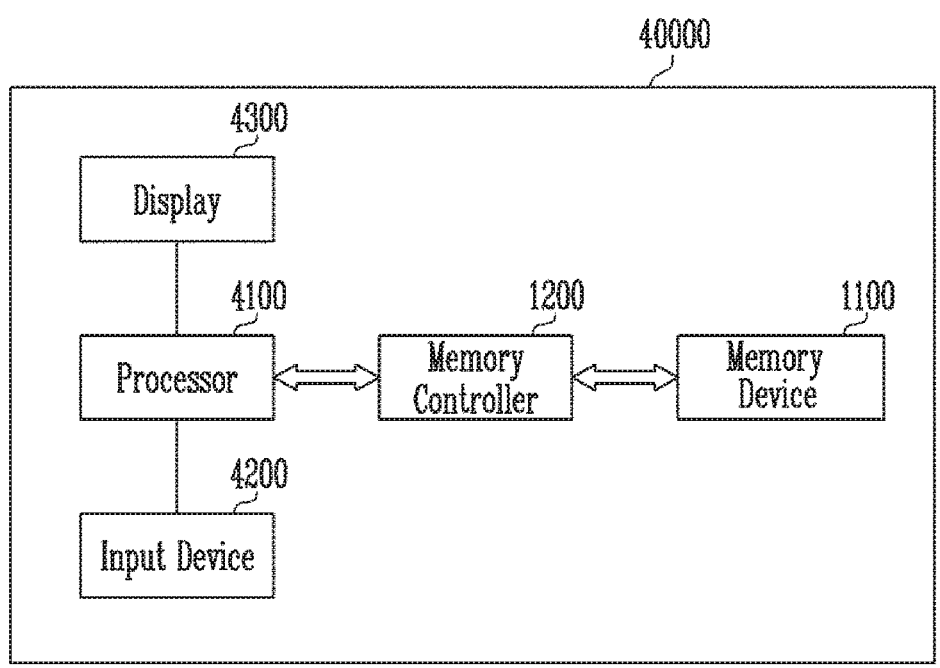
FIG. 15 is a diagram illustrating an example of a memory system including a memory controller in accordance with an embodiment of the present disclosure.

FIG. 15 is a diagram illustrating an example of a memory system 4000 including a memory controller in accordance with an embodiment of the present disclosure, for example, the memory controller 1200 shown in FIG. 1.

Referring to FIG. 15, the memory system 40000 may be embodied in a personal computer (PC), a tablet PC, a net-book, an e-reader, a personal digital assistant (PDA), a portable media or multimedia player (PMP), an MP3 player, or an MP4 player.

The memory system 40000 may include a memory device 1100, and the memory controller 1200 capable of controlling a data process operation of the memory device 1100.

A processor 4100 may output data stored in the memory device 1100 through a display 4300, according to data inputted from an input device 4200. For example, the input device 4200 may be embodied in a pointing device such as a touch pad or a computer mouse, a keypad, or a keyboard.

The processor 4100 may control the overall operation of the memory system 40000 and control the operation of the memory controller 1200. In an embodiment, the memory controller 1200 capable of controlling the operation of the memory device 1100 may be embodied as a part of the processor 4100 or a chip provided separately from the processor 4100.

Figure 16:
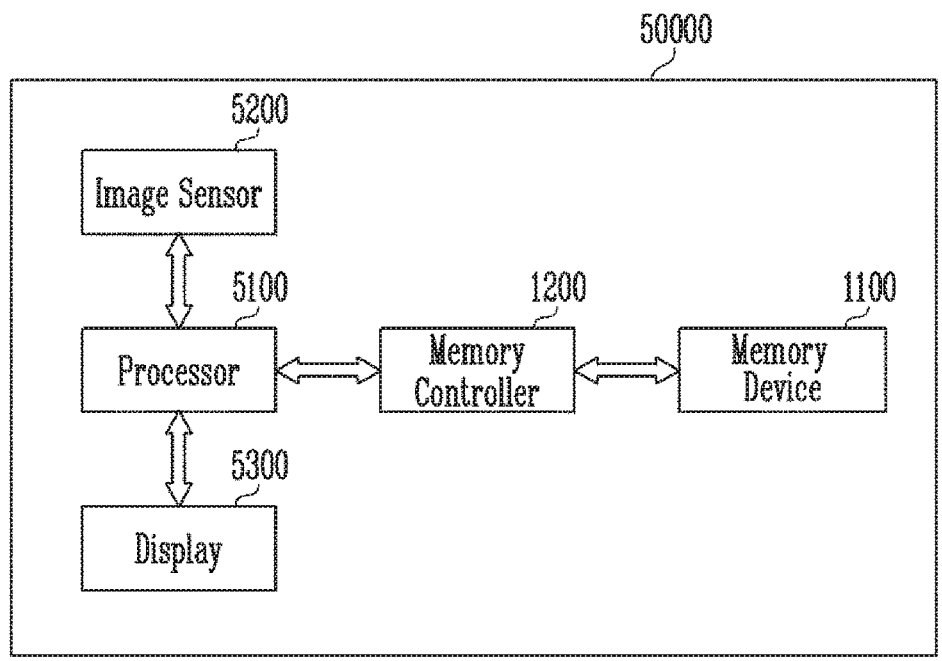
FIG. 16 is a diagram illustrating an example of a memory system including a memory controller in accordance with an embodiment of the present disclosure.

FIG. 16 is a diagram illustrating an example of a memory system 50000 including a memory controller in accordance with an embodiment of the present disclosure, for example, the memory controller 1200 shown in FIG. 1.

Referring to FIG. 16, the memory system 50000 may be embodied in an image processing device, e.g., a digital camera, a portable phone provided with a digital camera, a smartphone provided with a digital camera, or a tablet personal computer (PC) provided with a digital camera.

The memory system 50000 may include a memory device 1100, and the memory controller 1200 capable of controlling a data processing operation, e.g., a program operation, an erase operation, or a read operation, of the memory device 1100.

An image sensor 5200 of the memory system 50000 may convert an optical image into digital signals. The converted digital signals may be transmitted to a processor 5100 or the memory controller 1200. Under control of the processor 5100, the converted digital signals may be outputted through a display 5300 or stored to the memory device 1100 through the memory controller 1200. Data stored in the memory device 1100 may be outputted through the display 5300 under control of the processor 5100 or the memory controller 1200.

In an embodiment, the memory controller 1200 capable of controlling the operation of the memory device 1100 may be embodied as a part of the processor 5100 or a chip provided separately from the processor 5100.

Figure 17:
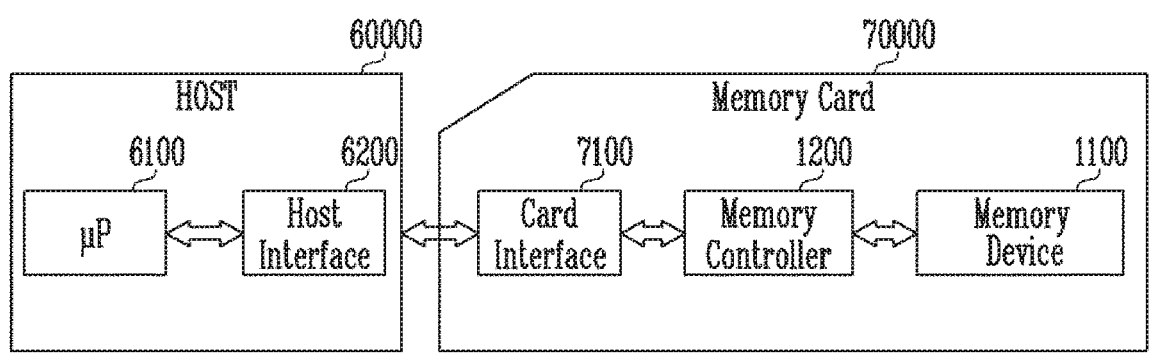
FIG. 17 is a diagram illustrating an example of a memory system including a memory controller in accordance with an embodiment of the present disclosure.

FIG. 17 is a diagram illustrating an example of a memory system 70000 including a memory controller in accordance with an embodiment of the present disclosure, for example, the memory controller 1200 shown in FIG. 1.

Referring to FIG. 17, the memory system 70000 may be embodied in a memory card or a smart card. The memory system 70000 may include a memory device 1100, the memory controller 1200, and a card interface 7100.

The controller 1200 may control data exchange between the memory device 1100 and the card interface 7100. In an embodiment, the card interface 7100 may be a secure digital (SD) card interface or a multi-media card (MMC) interface, but it is not limited thereto.

The card interface 7100 may interface data exchange between a host 60000 and the memory controller 1200 according to a protocol of the host 60000. In an embodiment, the card interface 7100 may support a universal serial bus (USB) protocol, and an interchip (IC)-USB protocol. Here, the card interface 7100 may refer to hardware capable of supporting a protocol which is used by the host 60000, software installed in the hardware, or a signal transmission method.

When the memory system 70000 is connected to a host interface 6200 of the host 60000 such as a personal computer (PC), a tablet PC, a digital camera, a digital audio player, a cellular phone, console video game hardware or a digital set-top box, the host interface 6200 may perform data communication with the memory device 1100 through the card interface 7100 and the memory controller 1200 under control of a microprocessor (pP) 6100.

As described above, a memory controller in accordance with the present disclosure may perform an unmap operation in various schemes depending on an unmap update size, so that the unmap operation time may be reduced, and addresses in a memory system may be efficiently managed.

Examples of embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A memory controller controlling a memory device including a metadata block and a user block comprising:
   an unmap controller configured to receive unmap information from a host, to calculate a first operation time required to perform a first unmap operation based on the unmap information, to calculate a second operation time required to perform a second unmap operation based on the unmap information, and to output an unmap command corresponding to an unmap operation having a shorter operation time of the first operation time and the second operation time; and
   a buffer memory configured to store L2P mapping information, L2 mapping information, and L1 mapping information,
   wherein the first unmap operation includes immediately updating the L2P mapping information, the L2 mapping information, the L1 mapping information, and mapping information stored in the metadata block, in response to the unmap information transmitted from the host, and
   wherein the second unmap operation includes storing the unmap information to the user block, and updating the L2P mapping information, the L2 mapping information, the L1 mapping information, and the mapping information based on the unmap information stored in the user block according to whether a capacity allocated in the user block is filled.

2. The memory controller according to claim 1, wherein the unmap controller comprises:
   a calculator configured to calculate the first operation time and the second operation time and to output a first calculation result value corresponding to the first operation time and a second calculation result value corresponding to the second operation time;
   an unmap determination circuit configured to compare between the first calculation result value and the second calculation result value and to output a determination signal corresponding to a less calculation result value between the first calculation result value and the second calculation result value; and
   an unmap command output circuit configured to output an unmap command selected depending on the determination signal among a plurality of unmap commands.

3. The memory controller according to claim 2, wherein the calculator comprises unmap calculators configured to check a logical block address included in the unmap information in different schemes and to output the check result values.

4. The memory controller according to claim 3, wherein the unmap calculators calculate an update size of the mapping information, and output the calculation result values.

5. The memory controller according to claim 1, wherein the buffer memory comprises:
   a logical-to-physical (L2P) map configured to store information about a physical address corresponding to a logical address;
   a physical-to-logical (P2L) map configured to store information about the logical address corresponding to the physical address;
   an L2 map including the L2P mapping information;
   an L1 map including the L2 mapping information; and
   an L0 map including the L1 mapping information.

6. The memory controller according to claim 5, wherein the first unmap operation includes updating the mapping information stored in the metadata block the memory device immediately when an unmap request is received from the host, and
   wherein the second unmap operation includes updating only the L2P mapping information, the L2 mapping information, and the L1 mapping information stored in the buffer memory until a plurality of unmap requests are received from the host, and updating the mapping information stored in the metadata block of the memory device at one time after the unmap requests have been received.

7. The memory controller according to claim 2, wherein the unmap information includes at least one of at least one logical addressor information about a start point and an end point.

8. The memory controller according to claim 7, wherein the calculator calculates the first operation time and the second operation time based on the number of logical addresses included in the unmap information, or wherein the calculator calculates a difference between the start point and the end point included in the unmap information, counts the number of logical addresses based on the difference, and calculates the first operation time and the second operation time.

9. A memory controller controlling a memory device including a metadata block and a user block comprising:
   a calculator configured to receive unmap information, and to output a first calculation result value and a second calculation result value based on the unmap information;
   an unmap determination circuit configured to compare the first calculation result value and the second calculation result value with each other, and to output a determination signal corresponding to a less calculation result value between the first calculation result value and the second calculation result value;
   an unmap command output circuit configured to output a first unmap command or a second unmap command in response to the determination signal;
   a control processor configured to perform a first unmap operation in response to the first unmap command or to perform a second unmap operation different from the first unmap operation in response to the second unmap command; and
   a buffer memory configured to store L2P mapping information, L2 mapping information and L1 mapping information,
   wherein the calculator comprises:
   a first unmap calculator configured to calculate a sum of a logical-to-physical (L2P) mapping write size, an upper mapping address write size, and a metadata write size as the first calculation result value based on the unmap information, and to output the first calculation result value corresponding to the first unmap operation; and
   a second unmap calculator configured to calculate an unmap write size about size of the unmap information as the second calculation result, and to output the second calculation result value corresponding to the second unmap operation,
   wherein the first unmap operation includes immediately updating the L2P mapping information, the L2 mapping information, the L1 mapping information, and mapping information stored in the metadata block, in response to the unmap information transmitted from the host, and
   wherein the second unmap operation includes storing the unmap information to the user block, and updating the L2P mapping information, the L2 mapping information, the L1 mapping information, and the mapping information based on the unmap information stored in the user block according to whether a capacity allocated in the user block is filled.

10. The memory controller according to claim 9, wherein the unmap command output circuit comprises:
    a first unmap command output circuit configured to output the first unmap command when a first determination signal is outputted from the unmap determination circuit; and
    a second unmap command output circuit configured to output the second unmap command when a second determination signal is outputted from the unmap determination circuit.

11. A memory system comprising:
    a memory device including a user block and a metadata block; and
    a memory controller configured to calculate a first operation time required to perform a first unmap operation based on unmap information received from a host, to calculate a second operation time required to perform a second unmap operation based on the unmap information received from the host, and to control an update timing of mapping information based on an unmap operation having a shorter operation time of the first operation time and the second operation time,
    wherein the memory controller stores L2P mapping information, L2 mapping information, and L1 mapping information,
    wherein the first unmap operation includes immediately updating the L2P mapping information, the L2 mapping information, the L1 mapping information, and mapping information stored in the metadata block, in response to the unmap information transmitted from the host, and
    wherein the second unmap operation includes storing the unmap information to the user block, and updating the L2P mapping information, the L2 mapping information, the L1 mapping information, and the mapping information based on the unmap information stored in the user block according to whether a capacity allocated in the user block is filled.

12. The memory system according to claim 11, wherein the first unmap operation includes updating the mapping information of the metadata block immediately in response to the unmap request, and wherein the second unmap operation includes preferentially writing the unmap information to the user block and thereafter updating the mapping information of the metadata block at one time.

\* \* \* \* \*